(12) United States Patent
Bhanot et al.

(10) Patent No.: US 12,177,063 B2
(45) Date of Patent: Dec. 24, 2024

(54) REAL-TIME ALERTING

(71) Applicant: Twilio Inc., San Francisco, CA (US)

(72) Inventors: Ravindra Ishmitra Bhanot, Foster City, CA (US); Minakshi Chandrashekhar Korad, Mountain View, CA (US); Scott Reynolds, San Francisco, CA (US); Thomas William D'Silva, Dublin, CA (US); Srirama Kolla, Highlands Ranch, CO (US); Sriram Ramarathnam, San Ramon, CA (US)

(73) Assignee: Twilio Inc., San Francisco, CA (US)

(*) Notice: Subject to any disclaimer, the term of this patent is extended or adjusted under 35 U.S.C. 154(b) by 18 days.

(21) Appl. No.: 18/120,982

(22) Filed: Mar. 13, 2023

(65) Prior Publication Data

US 2023/0291641 A1 Sep. 14, 2023

Related U.S. Application Data

(60) Provisional application No. 63/269,335, filed on Mar. 14, 2022.

(51) Int. Cl.
*H04L 41/0681* (2022.01)
*H04L 41/069* (2022.01)

(52) U.S. Cl.
CPC ........ *H04L 41/0681* (2013.01); *H04L 41/069* (2013.01)

(58) Field of Classification Search
CPC .......................... H04L 41/069; H04L 41/0681
See application file for complete search history.

(56) References Cited

U.S. PATENT DOCUMENTS

2002/0034959 A1* 3/2002 Jamieson ................ H04L 12/12
455/500
2004/0203721 A1* 10/2004 Grooms ................ H04W 24/08
455/67.11

(Continued)

FOREIGN PATENT DOCUMENTS

EP 0612191 A2 * 8/1994
EP 4156578 A1 * 3/2023 .......... H04B 7/0695
WO WO-03081577 A1 * 10/2003 ......... G10L 21/0208

*Primary Examiner* — Hitesh Patel
*Assistant Examiner* — Sandarva Khanal
(74) *Attorney, Agent, or Firm* — Schwegman Lundberg & Woessner, P.A.

(57) ABSTRACT

A method is disclosed for reducing inaccuracies in counts related to communication of messages in a manner that efficiently uses computer resources, including processing power and/or memory. An alert condition pertaining to delivery of a plurality of messages is received. The alert condition specifies a threshold number of dropped or failed deliveries. Based on a first time period elapsing, a first system check is performed. Based on a second time period elapsing, a second system check is performed. The second system check includes, based on a detection that the first message has failed during the second time period, decrementing the count for the dropped queue associated with the plurality of messages and incrementing a count for a failed queue associated with the plurality of messages, and, based on a detection that a second message has been dropped during the second time period, incrementing the count for the dropped queue.

20 Claims, 21 Drawing Sheets

(56) References Cited

U.S. PATENT DOCUMENTS

| | | | |
|---|---|---|---|
| 2008/0037482 A1* | 2/2008 | Douglas | H04W 24/00 370/338 |
| 2014/0211625 A1* | 7/2014 | White | H04L 43/0858 370/235 |
| 2020/0145897 A1* | 5/2020 | Jin | H04W 4/38 |
| 2020/0366596 A1* | 11/2020 | Licardie | H04L 43/0823 |
| 2023/0153223 A1* | 5/2023 | Sankaranarayanan | G06N 3/044 714/48 |

* cited by examiner

| ACCOUNTSID (VARCHAR) | DATASET (VARCHAR) | ALERT CONFIG SID (VARCHAR) | NOTIFICATION TYPE (ENUM) | MIMETYPE (VARCHAR, NULLABLE) | RECIPIENTS (VARCHAR) | TEMPLATE (VARCHAR) |
|---|---|---|---|---|---|---|
| AC0000000000 | | IS_DEFAULT | EMAIL | | | |
| | | | EMAIL | | | |
| | | | EMAIL | | | |
| AC123456 | | | EMAIL | | | |
| AC0000000 | | | EMAIL | | | |

FIG. 2

| | |
|---|---|
| ACCOUNT_SID(VARCHAR) | |
| DATASET(VARCHAR) | |
| ALERT_CONFIG_SID(VARCHAR) | |
| DATE_UPDATED_EPOCH_MILLI(BIGINT) | |
| DATE_CREATED_EPOCH_MILLI(BIGINT) | |
| FRIENDLY_NAME (VARCHAR, NULLABLE) | |
| DESCRIPTION(TEXT, MULLABLE) | |
| ALERT_LEVEL_THRESHOLD(DECIMAL(22.6)) | |
| COMPARISON(ENUM) | |
| OPERATION(ENUM) | |
| TIME_PERIOD(ENUM) | |
| RETRIGGER_WINDOW (ENUM, NULLABLE) | |
| MEASURE_FIELD_NAME(VARCHAR, NULLABLE) | |
| RECORDFILTER(JSON, NULLABLE) | |
| ENABLED (BOOLEAN) | |
| FLAP_DETECTION_METHOD(ENUM | |

*FIG. 3*

"account_sid": "<PARENT_ACCOUNT_SID>",

"recordFilter": {"field_name": {"string": "sub_account_sid"},
"field_value": {"string": "IS_NULL"}, "operator_type": "LEAF", "operands": null }, "equality_type": "EQUALS",

*FIG. 4A*

"account_sid": "<SUB_ACCOUNT_SID>",

*FIG. 4B*

"account_sid": "<PARENT_ACCOUNT_SID>",

*FIG. 4C*

```
{"alert_config_sid": "AK10002",
"account_sid": "AC40c3a0fa4f71f6f0b7cbd895724fb211",
"recordFilter": { "field_name": {"string": "status"},
"equality_type": "EQUALS",  "field_value": {"string": "UNDELIVERED"},
"operator_type": "LEAF",  "operands" : null },
"dataset": "ReportCenter.OutboundMessages",
"measure_field_name": {"string": "latency"}},
"threshold": { "alert_level_threshold": 15000000.000000,
"comparison": "ABOVE",  "operation": "SUM",  "time_period": "FIVE_MINS",
"retrigger_window": "FIVE_MINS"},
"date_created_epoch_milli": 1599071100000, "date_updated_epoch_milli": 1599071100000, "flap_detection_method":
"TRIGGER_ONCE_A_DAY"}
```

FIG. 5

```
{"alert_config_sid": "AK12345678912", "account_sid": "AC40c3a0fa4f71f6f0b7cbd895724fb211", "recordFilter":
{ "field_name": null, "equality_type": "EQUALS", "field_value": null, "operator_type": "OR", "operands":
"array": [ {"field_name": {"string": "status"}, "equality_type": "EQUALS",
"field_value": {"string": "SENT"},    "operator_type": "LEAF",
"operands": null
},
{    "field_name": {"string": "status"},     "equality_type": "EQUALS",
"field_value": {"string": "DELIVERED"},    "operator_type": "LEAF",
"operands": null    } ] },
"dataset": "ReportCenter.DeliveredMessages", "measure_field_name": null,
"threshold": { "alert_level_threshold": 1.000000, "comparison": "ABOVE",
"operation": "COUNT", "time_period": "FIVE_MINS" },
"date_created_epoch_milli": 1588096800000, "date_updated_epoch_milli": 1588096800000, "flap_detection_method":
"TRIGGER_ONCE_A_DAY"}
```

FIG. 6

```
{"alert_config_sid": "AK10001", "account_sid": "AC40c3a0fa471f6f0b7cbd895724fb211", "recordFilter": {

"field_name": {"string": "status"}, "equality_type": "EQUALS", "field_value": {"string": "UNDELIVERED"}, "operator_type": "LEAF", "operands": null}, "dataset": "ReportCenter.OutboundMessages", "measure_field_name": null, "threshold":

{ "alert_level_threshold": 5.000000, "comparison": "ABOVE", "operation": "COUNT", "time_period":
"FIVE_MINS", "retrigger_window": "FIVE_MINS"}, "date_created_epoch_milli": 1599071100000, "date_updated_epoch_milli": 1599071100000, "flap_detection_method":
"TRIGGER_ONCE_A_DAY"}
```

FIG. 7

{"alert_config_sid": "AK10001",

"dataset": "ReportCenter.OutboundMessages", "account_sid": "AC40c3a0fa471f6f0b7cbd895724fb211", "alert_time_epoch": 1599072100000, "metric_value": 10.000000, "alert_status": "ERROR", "should_notify":true`}

FIG. 8

{ "alert_config_sid": "AK10001", "dataset": "ReportCenter.OutboundMessages", "account_sid": "AC40c3a0fa4f1f6f0b7cbd895724fb211", "alert_time_epoch": 1599907213600, "metric_value": 1.000000, "alert_status": "RECOVERED", "should_notify": true }

FIG. 9

REAL-TIME ALERTING

CLAIM OF PRIORITY

This application claims the benefit of priority of U.S. Provisional Application Ser. No. 63/269,335, filed Mar. 14, 2023, which is hereby incorporated by reference in its entirety.

TECHNICAL FILED

The subject matter disclosed herein generally relates to methods, systems, and machine-readable storage media for a monitoring and alerting platform for messages, calls, errors, and other metrics.

BACKGROUND

Entities, such as public or private corporations, have unique needs for monitoring and managing their customer engagement. Current solutions require businesses to make significant investments in hardware and support and offer only pre-packed implementations that are limiting.

BRIEF DESCRIPTION OF THE DRAWINGS

FIG. 2 is a table schema for the notification table.

FIG. 3 is a table schema for an alert configuration table.

FIG. 4A is an example of a subaccount strategy.

FIG. 4B shows a set alert on the parent account.

FIG. 4C shows an alert on the subaccount.

FIG. 5 shows an example alert configuration definition.

FIG. 6 shows an example alert configuration with a single filter.

FIG. 7 shows an example alert configuration with composite filters.

FIG. 8 shows an example of an alert configuration for an error alert.

FIG. 9 shows an example of an alert configuration of a recovered alert.

DETAILED DESCRIPTION

Figure 1:
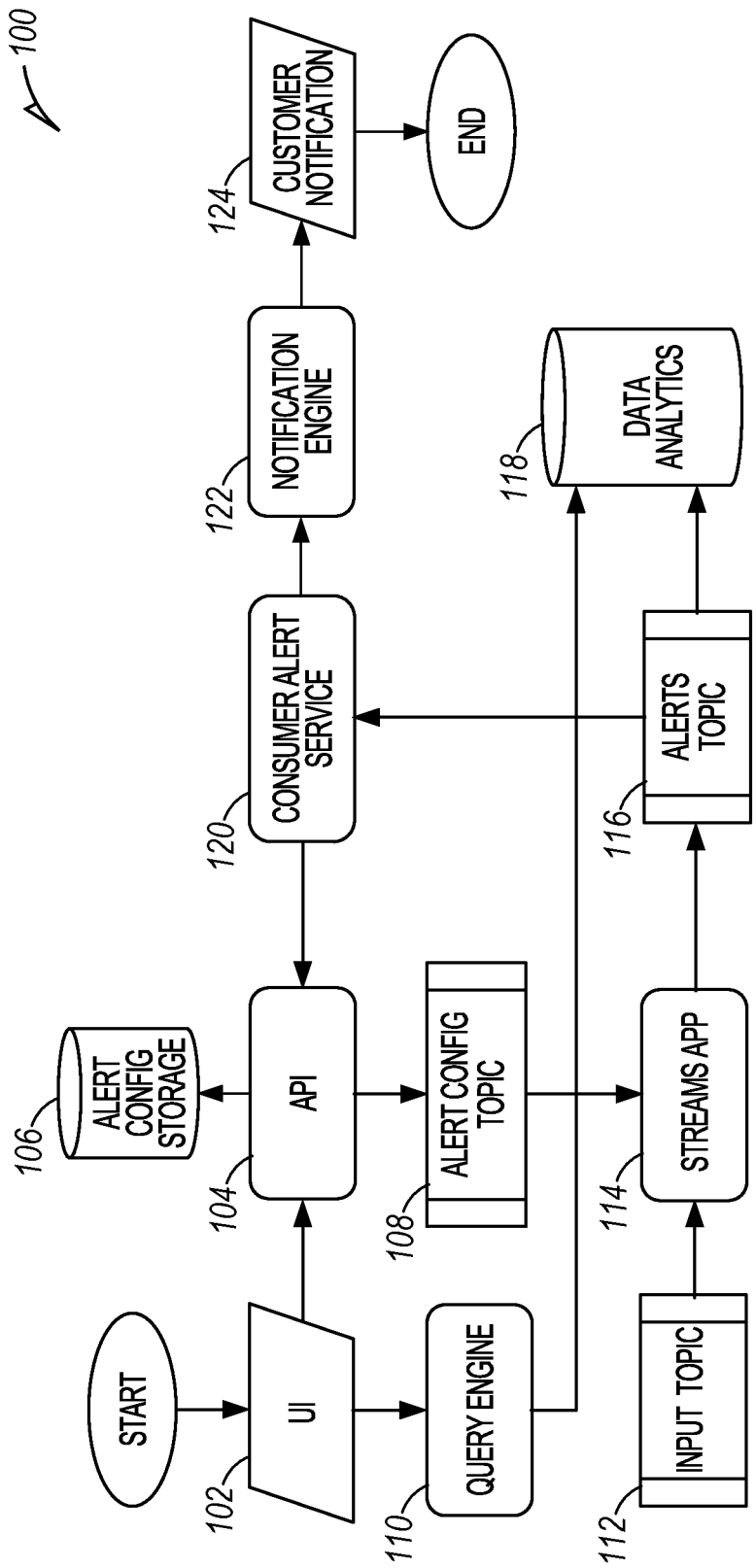
FIG. 1. shows a system for providing real-time alerts by setting up alert configurations using a user interface.

Example methods, systems, and computer programs are directed to monitoring large amounts of metrics defined by the end-user in real-time. Examples merely typify possible variations. Unless explicitly stated otherwise, components and functions are optional and may be combined or subdivided, and operations may vary in sequence or be combined or subdivided. In the following description, for purposes of explanation, numerous details are set forth to provide a thorough understanding of example embodiments. However, it will be evident to one skilled in the art that the present techniques may be practiced without these specific details.

In example embodiments, methods, systems, and computer-readable storage media are disclosed to monitor large amounts of metrics defined by the end user in real-time. In particular, operations are described for keeping track of state changes of a metric in a real-time/near real-time manner such that the state changes do not trick a system into sending false alerts to the end-user based on the metrics exceeding a predefined and/or configurable threshold count.

Methods, systems, and computer programs are presented for a platform that monitors and sends alerts pertaining to messages, calls, and errors. Historical systems may have a complex fabric of web callbacks using multiple software tools that require a high amount of engineering and produce false positive error results or count the same message, call, or alert multiple times, increasing the error count artificially. In contrast, the system, method, and/or computer-readable media disclosed herein give customers the ability to craft an alert specific to their business and scales to all of the accounts on a communication platform, such as the communication platform provided by Twilio, Inc. Overlaying such alerts with time-series graphs of customer data may help customers decipher the failures as well as help them understand the nature of their data efficiently. By leveraging data platform libraries and event streams, the disclosed system, method, and/or computer-readable media applies to existing events right out of the box. Improvements to tracking state changes of one or more metrics are described herein. The user or end-user can set an alert condition triggered by checking and updating the state of various alert conditions in a preset time period. Previous states are removed from threshold counts, so fewer false alerts of problems will be sent to the end user. In some embodiments, there is no need to query the message in each state separately.

System, method, and/or computer-readable media to setup alert conditions to give notifications to a customer in relation to an increase in specific messages (e.g., error messages having a particular code, such as an error code, messages getting tagged as spam, or messages not getting delivered to particular devices or users), sent from the customer. Other examples of use can include determining when to end a marketing campaign based on metrics that define either Success or Failure scenarios for their business or determining whether phone numbers (or other user contact methods) are out of compliance and must be updated in order to maintain compliance with new regulations established by a regulatory authority. The operations disclosed herein may improve the customer experience of the monitoring and processing alerting function so that risk related to either under-reporting or over-reporting of alerts is reduced or eliminated, allowing the customer to focus on utilizing the alerts as presented instead of having to process the alerts further to remove noise that is, in some cases, caused by duplication of alerts.

Customers of a communication platform may be able to set up a query specific to a notification channel. The communication platform can proactively send notifications out to technical account managers (TAMs) or allow the account holder themselves to monitor, correct, or change the behavior of the communication platform.

Another advantage of this system relative to conventional systems is that the state management prevents the alert from being inaccurately triggered even when a first message was identified as having failed and then dropped. Messaging insights can be sent to customers who set up alerts. For example, a customer can set up an alert when the number of errors with a specific error code has exceeded a percentage of the message within the past 5 minutes. This percentage, which is the threshold, in some cases, could be a moving percentage that is updated during a specific time period. The insight information and alerts can also be sent to debuggers in order to help with debugging needs. In some embodiments, the insights and information are sent to a TAM instead of a debugger. The role of a TAM is to provide real-time monitoring of customer applications via one or more product(s) of a communication platform comprising the APIs in order to provide proactive notification and remediation of issues. A sample use case would be that a TAM wants to inform the customer that an application, such as Twilio Studio Flow, is stuck in a particular state and should be killed or restarted.

In example embodiments, a method is disclosed for efficiently reducing inaccuracies in counts related to communication of messages is disclosed. An alert condition pertaining to delivery of a plurality of messages is received. The alert condition specifies a threshold number of dropped or failed deliveries. A first system check is performed based on a first time period elapsing. The first system check includes, based on a detection that a first message of the plurality of messages has been dropped during the first time period, incrementing a count for a dropped queue associated with the plurality of messages. A second system check is performed based on a second time period elapsing. The second system check includes, based on a detection that the first message has failed during the second time period, decrementing the count for the dropped queue associated with the plurality of messages and incrementing a count for a failed queue associated with the plurality of messages, and, based on a detection that a second message has been dropped during the second time period, incrementing the count for the dropped queue, and generating an alert based on a total of the dropped queue and the failed queue transgressing the threshold number.

FIG. 1 shows a system 100 for providing real-time alerts by setting up alert configurations using a user interface 102. In example embodiments, the alert configurations may be stored by posting the configuration to the API 104 and in alert configuration storage 106. The alert configuration may be read by an API 104, such as a stream application that consumes the existing events. The query engine 110 provides the alert condition checked for by the alert configuration. The streams application 114 may produce records to the alert topic 116 in an ordered log of events when an alert is triggered or when an alert has recovered. These alerts 116 can be sent to data analytics 118 or consumer alert services 120. A notification engine 122 can send notifications of the alerts triggered to the user or TAMs using customer notification 124.

The alert configuration can be set up on the UI 102 that presents the data and provides controls to show the user when that historical data would result in generating one or more alerts. The UI 102 may provide user interface elements for specifying one or more lower boundaries and one or more upper boundaries for a metric tracked in real-time. The lower boundary could, in some embodiments, be set to 0. In some examples, the boundary condition could look for the number of error code messages or for a specific error message. Other metrics could be set for the alert condition. The alert condition can be set to associate a color with one or more of the specified boundaries and/or to send an alert when the metric crosses one or more of the specified boundaries.

In example embodiments, the UI 102 comprises a shared alert builder in which one or more alerts pertaining to one or more metrics may be defined, including, for each alert, multiple lower boundaries, multiple upper boundaries, one or more color metrics, and one or more "send alert" options.

In example embodiments, a performance threshold maximizes the number of alert configurations (e.g., alertConfigs) per account identifier (e.g., Security Identifier or SIDs).

The following example considers two datasets with very different traffic profiles—

1. OutboundMessages—higher volume (peaks between 40 k-50 k records per second) with spiky behavior at 6 am, 9 am, and 12 pm Pacific time due to the jobs that are run by customers to send messages.

2. DebugEvents—lower volume (400 to 1000 records per second). Small peaks but more or less constant traffic.

Some system variables can include the number of partitions of input topic 112 (e.g., shards), the number of records per second (e.g., peak load), and the number of seconds before the delay in triggering alert is called a violation (e.g., acceptable delay in the notification).

In some embodiments, the alert configuration may be processed and put onto an ordered log of events detailing how a streaming API 114 may process the input topic 112 and the alert config. topics 108 according to the alert configurations and how to allow customer teams (e.g., TAMs, Messaging, etc.) current insights into the alerts and to get historical alert data to overlay the same on the customer's current graphs to help visualize the full picture. In some embodiments, the historical alert data is processed using a data engine.

An API 104 may be used for front-loading the alert configuration creation. In some embodiments, one or more APIs 104 can be used. These APIs 104 can be integrated with the communications platform and/or act as an integration module between different streams.

PUT /AlertConfig/{AccountSid}/{DatasetName}—PUT endpoint accepting a request body containing the entire AlertConfig. Stores into a dataset well as produce onto Alert configuration s topic for the dataset.

DELETE AlertConfig/{AccountSid}/{DatasetName}/{AlertConfigSid}—DELETE endpoint to delete an alert configuration. The alert configuration can be deleted if it has already been disabled.

PUT /AlertConfig/{AccountSid}/{DatasetName}/{AlertConfigSid}—PUT endpoint that accepts the full JSON body of the alert configuration, updates the fields as well as produces onto alertConfigs topic for the dataset.

GET /AlertConfig/{AccountSid}/{DatasetName}/{AlertConfigSid}—GET endpoint to fetch the alertConfig from the datastore given the account identification, dataset, and alertConfigSid.

GET /listAlertConfigs/{AccountSid}?DatasetName—GET endpoint to fetch the list of alert configuration identifications (which in some embodiments may be secure account identifications). A user monitoring this can iterate over to know more about each alert configuration. In some embodiments, the system can provide the customer with suggestions to update the alert configuration.

A dataset may be used by the different API 104 modules to support the configuration storing capabilities and be distributed to provide easy failover protection.

Account users and TAMs can declare custom email templates and use or allow multipart/mixed and text/plain schemata, which can store default templates. Mail user agents (MUA) allow multipart or mixed email templates in some embodiments. The MUA allows other specialized and customizable templates to provide inline images below or above and just plain text data items.

FIG. 2 is a table schema for notification table 200. In example embodiments, a default template for all accounts associated with a particular customer may be stored in a default account.

FIG. 3 is a table schema for an alert configuration table 300. The table schema provides the metrics that the alert configuration can be configured to track.

FIG. 4A is an example of a subaccount strategy. Many Independent Software Vendors (ISVs) have a high number of subaccounts. Therefore, subaccount data may be treated as parent account data in the case of such accounts. To support this, a parent account may create alerts across some or all subaccounts, and a parent account may create an alert for a particular subaccount.

In example embodiments, when a parent account wants to create an alert config for a single subaccount, the name of the subaccount may be in the body of the alert configuration. The alert configuration can be stored in the record filters in some embodiments. If a subaccount itself wants to create an alert configuration on that account, the subaccount can create the alert configuration on the subaccount directly, treating it as a top-level use case.

An example of a key record for a normal parent account alert configuration is <AccountSid>_<dataset>_<Alert configuration Sid>. An example of a key record for a subaccount alert config is <SubAccountSid>_ <dataset>_ <AlertConfigSid>. Other examples are possible.

In example embodiments, alert configurations may be fetched independently from the alert configuration storage in the streams app and/or may process alert configurations for either (or both) parent accounts or subaccounts separately. The above set of example APIs may work similarly for subaccounts.

FIGS. 4B and 4C show three examples concerning parent and subaccounts.

FIG. 4B shows a set alert on the parent account. In example embodiments, the system wants no account ID to be present for the sub_account_sid field. The record filter field of the alert configuration may contain a filter like assuming the absence of a subaccount in a record is indicated through a sentinel string "IS NULL" or a null object.

FIG. 4C shows an alert on the subaccount. In example embodiments, the system wants to get alert configs that match a subaccount as well as impose limits on the number of alert configurations a subaccount can have. Thus, it is a top-level construct and needs nothing specific in the recordFilter field apart from the customer logic needed. The alert configuration may contain the sub_account_sid in the account_sid field. The alert configuration is set on all transactions for the parent account. In some embodiments, this can be irrespective of the subaccount. In example embodiments, this will entail just using parent account security identification in the account ID field of the alert configuration and nothing specific in the recordFilter part apart from the customer logic needed.

FIG. 5 shows an example alert configuration definition. Which includes at least the following fields:

1. time_period→An alert config may define the window for which the customer aggregates metrics and alerts. The time period can be a window as long as a minute or as long as one day.
2. recordFilter→Properties of fields may be defined based on which filter a metric is calculated over this set of records.
3. operation→Type of operation to be performed on aggregated values. Supported operations may include sum, count, average, and percentage.

FIGS. 6, 7, 8, and 9 all show different alert configurations. FIG. 6 shows an example 600 alert configuration with a single filter. FIG. 7 shows an example 700 alert configuration with composite filters. This shows a definition of a triggered alert. FIG. 8 shows an example 800 of an alert configuration for an error alert. FIG. 9 shows an example 900 of an alert configuration of a recovered alert.

Alerting Stream-Based Application

To alert at scale, example embodiments may use a streaming API 104 to calculate metrics in real-time. In example embodiments, the streaming application uses state stores to hold aggregates. The alert configuration may aggregate data associated with a specific account ID and time window. A Partition Key may be determined by either or both the specific account ID or the time window. The system tracks and stores the state of the message or events used by the API 104. The application can prevent both alerting twice and prevent the application from missing an alert. Using state stores provides additional technological improvements to reduce downstream dependencies and failure scenarios.

Figure 10:
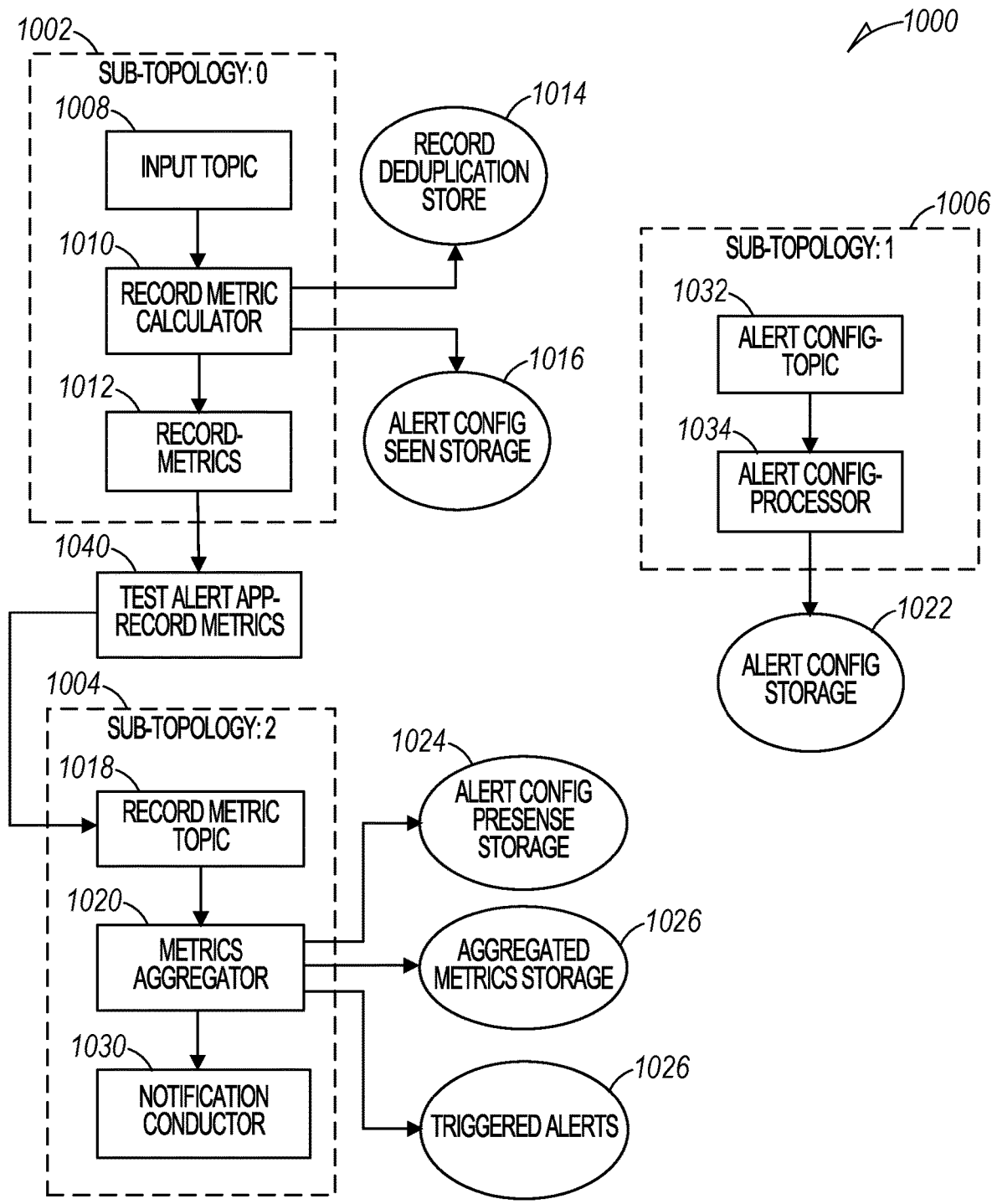
FIG. 10 shows an example topology of a stream application.

FIG. 10 shows an example topology 1000 of a stream application. The stream application may be configured to run on a role per dataset (e.g., integration), punctuating on a particular time interval (e.g., every 60 seconds). In example embodiments, the application is split into two parts, part A includes 1004 sub-topology 1006 of the example topology 1000, and part B includes sub-topology 0 1102 and sub-topology 2 of example topology 1000.

Part A) Consume Alert Configurations

In example embodiments, a streaming application (or a batch application) searches a large event stream for a few abnormal events. In example embodiments, the system can filter the events before repartitioning the data. Part A is configured to broadcast to each stream processor the filters to apply to each event so that the uninteresting events can be discarded prior to shuffling or repartitioning. Each alert configuration can be broadcast to each stream application instance as Global State-store. This allows each stream application instance to filter any event without shuffling the event into a co-partition of the configuration Part B) Consume Fact topic and above alert configs to emit a record when an alert is triggered.

INPUT TOPIC 1008—The input topics 1008 may need to be joined with corresponding alert configs that match the record so aggregated values can be calculated and checked against the thresholds defined in the alert configuration.

Example embodiments calculate minute-level aggregates from input records that match against alert configurations. Example embodiments punctuate these aggregates (e.g., roll-up across minutes depending on alert configuration's predefined time period value or time period window) and check the rolled-up value against a threshold value. In example embodiments, this is implemented through various components, such as two processors. In some embodiments, this is implemented using a punctuator instead or in addition to the processors.

Record Metric Calculator 1010→Based on the operation specified in the alert configurations, this processor processes each record, filters out according to record filter criteria and updates the record's metric value for a given alert config. Records that could lead to deduplication are recorded in record deduplication store 1014, and alert configurations that are seen are recorded in alert configurations seen storage 1016. These counts are sent to recorded and sent to the record metric calculator 1010. The resulting record is returned to the broker onto a record-metrics topic 1012.

Metrics Aggregator 1020→This processor consumes record-metrics 1012 and adds the metric value to minute-level aggregates and/or roll-ups for each alert config.

Punctuator→Reads the threshold from "alert-store" and/or the records filtered for an account from "aggregated-metrics-store"; may perform transitive operations across windows. The punctuator goes over all or a subset of alert configurations that are locally present in an instance's Metrics Aggregator 1020 store and fires alerts that represent a changing state—e.g., either from healthy to unhealthy or vice versa. For each alert configuration that is in an unhealthy state and the alert hasn't already been fired, it produces an alert record. The punctuator also processes all or a subset of the alerts that transition from "unhealthy" to "healthy" since the last punctuation and sends a recovery message. The application stores a limited data set to limit the amount of data processed in each punctuation. In some embodiments, this can be a time period that includes 24 hours worth of data.

Notification Conductor 1030→In example embodiments, if an alert is flapping (becomes unavailable and available over and over again in a short period of time) between ERROR and RECOVERED states, a heuristics-based cooldown strategy may be selected wherein a decaying weight strategy over state changes is chosen based on how recent the state change was.

Example behavior: 1 Alert configured for AC123 with threshold=3 debug events for a 24-hour evaluation period.
  2/1/20 10 am—1 debug event for AC123
  2/1/20 1 pm—1 debug event for AC123
  2/1/20 4 pm—1 debug event for AC123
  2/1/20 4 pm—Alerted Status published (1) to Alerts
  2/2/20 10:01 am—Recovered Status published to Alerts
  2/2/20 11 am—1 debug event for AC123
  2/2/20 11 am—Alerted status published (2) to Alerts
  2/2/20 1:01 pm Recovered status published to Alerts
  2/2/20 2 pm 1 debug event for AC123
  2/2/20 2 pm Alerted Status published (3) to Alerts Options in Terms of Customer Experience:
  1) Notify the customer as if a regular alert was received (e.g., don't care about flapping and let end user/customer care about it through, for example, tweaking of alert config).
  2) Let the customer know that the alert configuration is flapping and that they should change it to suit their needs.
  3) Not notify the customer if the use case deems it not worthy of being notified.

Example embodiments may be configured to classify the past history of an alert configuration as flapping or not. Example embodiments may query the history for the last 7 time windows of the time period defined in alert configuration. The value can be weighted. Starting from a weighted value of 1, example embodiments may decrease the weight by 0.1 for each window that elapses since the current time. Apply this weight to the state changes from history for the last 7 windows, sum them up, and then divide the sum by 7. If the answer to the above equation is more than 0.5, there is a high chance of flapping.

One example use case can be looking at a time period of 5 minutes, and a query to the history for the last seven time periods for a told of 35 mins of history is considered. If there are three state changes (such as ERROR to RECOVERED or RECOVERED to ERROR) within the last 5 minutes and nothing before that, the volatility of the system may be calculated by $V=(1.0+1.0+1.0)/7=0.42$. If there are 5 state changes in the last 25 minutes, each happening 5 minutes apart, the volatility can instead be calculated by $V=(1.0+0.9+0.8+0.7+0.6)/7=0.57$. This allows for an objective determination of the volatility of the system. Technological advantages of the above application include the state stores and their uses.

1. Alert-config-store 1022→Global state store to store, update, and delete alert configurations. The global state storage stores the alert config-topic 1032 and the processed alert configuration from from the alert config-processor 1034.

2. Alert-config-seen-store 1016→Simple key-value store to send a sentinel record into the record-metrics 1012 the first time the application sees a new alert configuration (not found in the alert-config-seen-store 1016).

3. Alert-config-presence-store 1024→Key value store to keep track of alert configurations local to a data stream instance in terms of record metrics. Helps with iterating over the set of alert configurations at the time of punctuation (checking aggregates in an instance against alert configurations local to an instance).

4. Record-deduplication-store 1014→Key value store to store input records with unique idempotency key. Deduplicating an update is issued for an input record, which allows us to subtract from the old aggregate and add to a new aggregate.

5. Aggregated-metrics-store 1026→Session store to store minute-level aggregates and update for each record-metrics record consumed in MetricsAggregator. In some embodiments, the aggregated-metrics storage 1026 is used by either the processors or the punctuator to read aggregates based on roll-up windows defined in alert configurations.

6. Triggered-alerts-store 1028→Key value store to keep track of the last alert state or metric value produced from the punctuator.

Notification System

When the streaming application produces an ERROR or RECOVERED message on the Alerts topic, a corresponding component (e.g., corresponding to a guest team) may be expected to consume that message and notify the appropriate person or system. The alert configuration may provide a template (e.g., an email template) that can be used to send an email (e.g., via an email distribution tool, such as Sendgrid).

In example embodiments, this template may be configured for other forms of notifications, like webhooks, phone numbers for SMS, slack webhooks, etc.

For each alert record put out by the streams app, either triggered or recovered, data may be written into an analytics 118.

Triggered Alerts may be stored as another dataset in the analytics database 118. This may allow example embodiments to, for example:

1. Store alerts for historical reasons.
2. Run GDPR compliance pipelines. This could include deleting the account or deleting personal information related to the account.
3. Let guest teams query and aggregate over alerts in any useful way. This historical data of alerts may be queried (e.g., using specialized POST endpoints in a report center data engine). An example API definition may include the following:

/v1/executeQuery/<AccountSid>?startDate=<epochTimeInMilliseconds>&endDate=<epochTimeInMilliseconds>

/v1/executeQuery/<AccountSid>/<SubAccountSid>?start Date=<epochTimeInMilliseconds>& end Date=<epochTimeInMilliseconds>

In example embodiments, this data can then be laid over the regular data (e.g., with alerts). In example embodiments, an alert history may be included as part of the response for querying data for any supported dataset.

Figure 11:
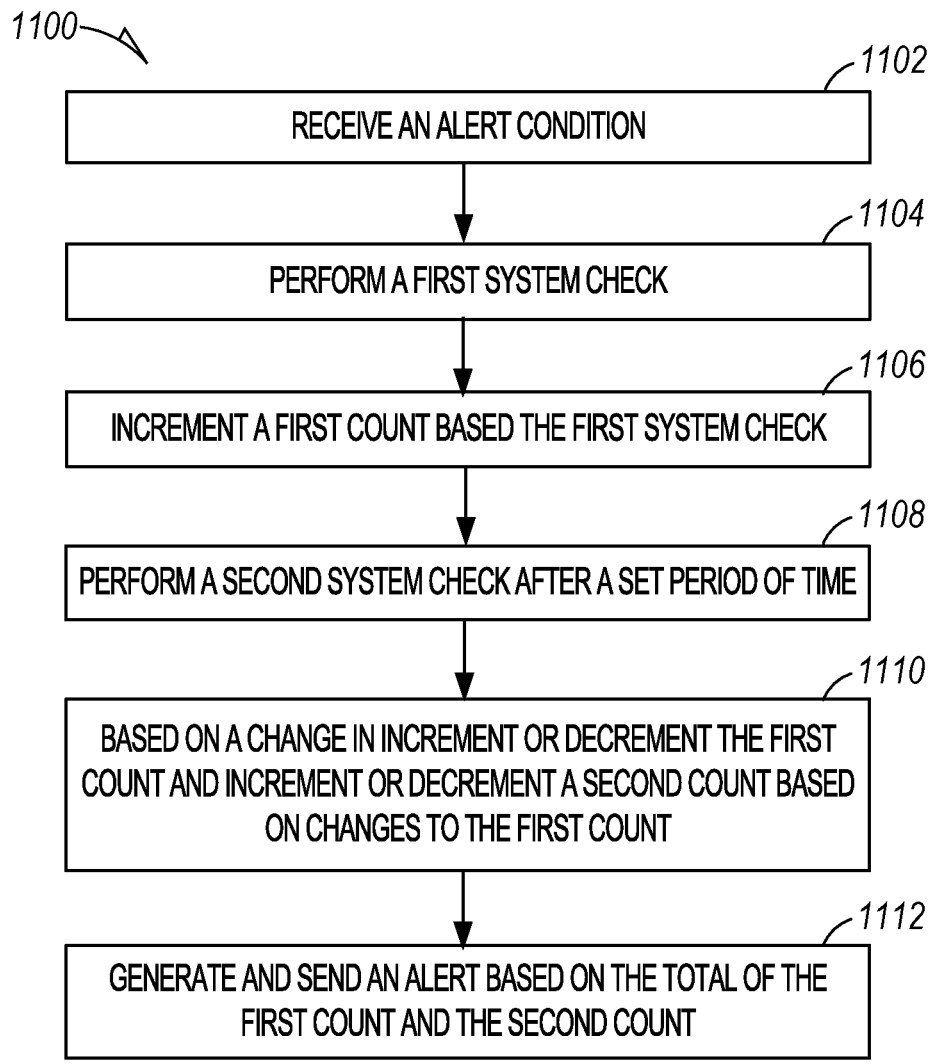
FIG. 11 is a flow chart of the method.

FIG. 11 is a flowchart of an example method 1100 for reducing inaccuracies in counts related to communication of messages in a manner that efficiently uses computer resources. While the various operations in this flowchart are presented and described sequentially, one of ordinary skill will appreciate that some or all of the operations may be executed in a different order, be combined or omitted, or be executed in parallel.

At step 1102, the alert condition is received. The alert condition determines the alert configuration. The alert condition specifies the threshold number of dropped or failed deliveries in a campaign.

At step 1104, the system performs a first system check. The system check is performed based on a first time period elapsing. In some embodiments, the system check includes a detection that a first message of the plurality of messages has been dropped during the first time period. The detection could also be of other metrics defined by the alert configuration instead of or in addition to the detection if the message has been dropped.

Step 1106 increments a first count based on the system check. The incrementing of a count for a dropped queue is associated with the plurality of messages.

At step 1108, the system performs a second system check. This second system check may happen after a set period of time.

At step 1110, based on a change in the state of the message, the first count is either incremented or decremented, and based on the changes to the first count, increment or decrement a second count. An example of this would be a first count for dropped messages (dropped queue) and a second count for failed messages (failed queue). If a message has changed states from dropped to failed, then based on a detection that the first message has failed during the second time period, the count for the dropped queue associated with the plurality of messages is decremented, and a count of a failed queue associated with the plurality of messages is incremented. Other metrics could be counted in the second time period as defined by the alert configuration.

At step 1112, an alert is generated based on the total count of the first count and the second count. The generating of the alert may be based on the total of the dropped queue and the failed queue transgressing a threshold number. The generated alert could also be based on other metrics defined by the alert configuration.

The examples below show examples of alerts configured to trigger when more than one message is either in a Dropped State or Failed State within a particular time frame; for example, when the window for the time period is 5 minutes.

A 1st message comes in at 11:18 am and is queued for sending.

The system checks for the state of messages and updates queued state count to 1.

The system checks at 11:19 am to see if the alert condition is triggered. In this example, there is no alert condition triggered. Therefore no state change.

A 2nd message comes in as queued at 11:20 am.

The queued state count is updated to two during the system check at 11:20 am, and the system checks if the alert condition is triggered.

At 11:21 am, the first message gets dropped.

At 11:21 am, the system checks if the alert condition is triggered and subtracts one from queued state count, and adds one to the dropped state count. No message to a user is sent.

At 11:22 am first message status is changed to the failed state.

System check at 11:22 am, and the system subtracts one from a dropped state count and adds one to a failed state count. No message is sent to a user because the alert condition is not triggered.

At 11:26 am, the second message gets dropped.

The system checks at 11:26 am, and the system adds one count to dropped state count. Here, the alert condition is met. One message is in a dropped state, and one message is in a failed state. A message is sent to the user because the alert condition is triggered, and the user is alerted.

Figure 12:
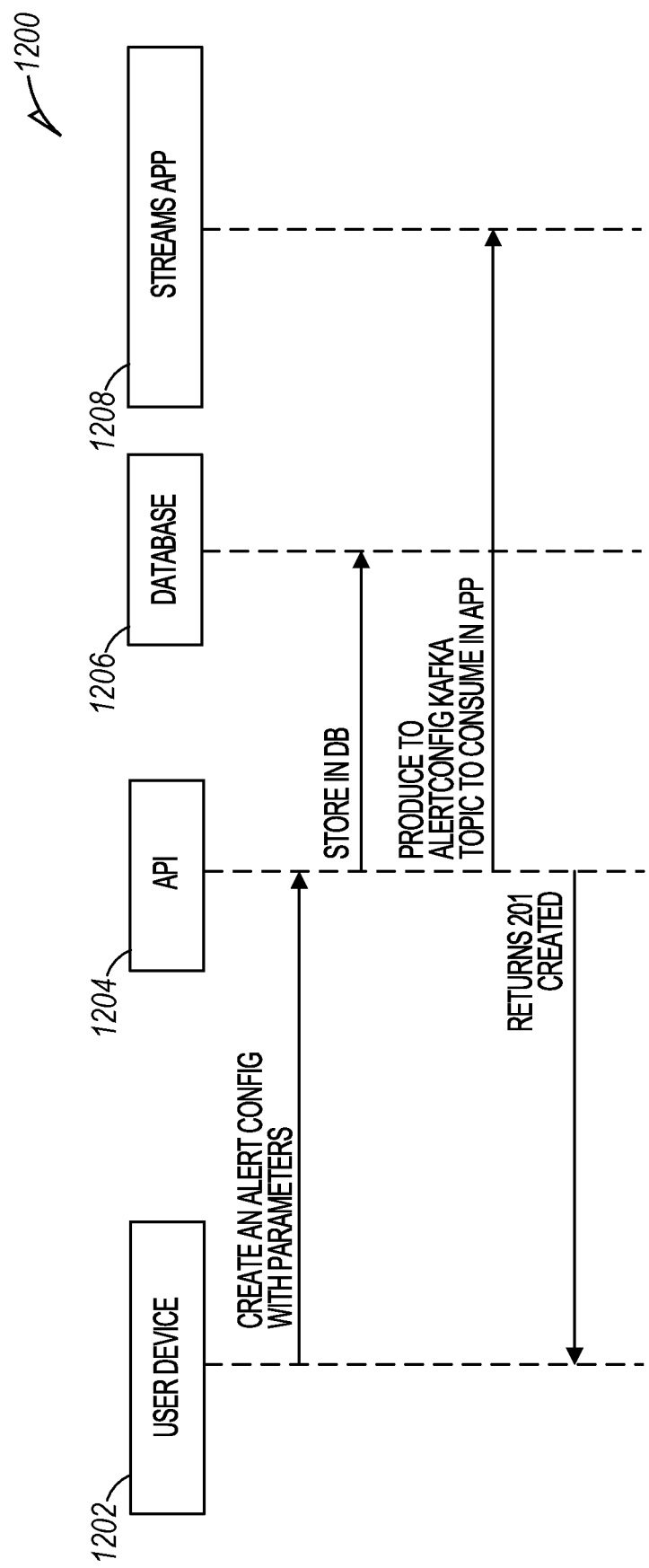
FIG. 12 shows sequence diagrams for a team interaction with the alerting system when creating an alert configuration.

FIG. 12 shows sequence diagram 1200 for a team interaction with the alerting system when creating an alert configuration. The user device 1202 can send instructions to the API 1204. The API 1204 can forward the instructions to the database 1206 or the streams API 1208 and return an alert to the user device 1202.

Figure 13:
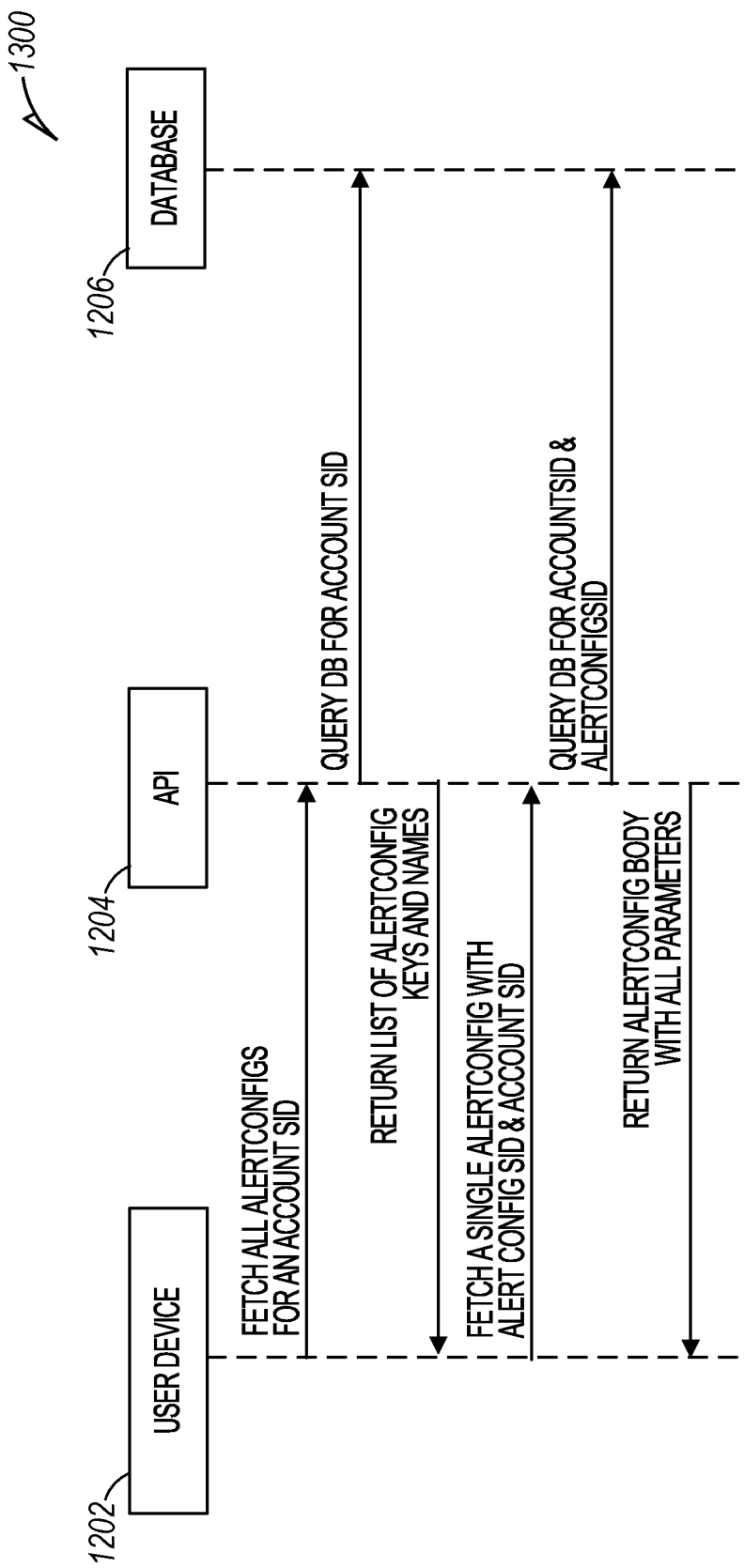
FIG. 13 shows a sequence diagram for querying all alert configs for an account.

FIG. 13 shows a sequence diagram 1300 for querying some or all alert configurations for an account. The API 1204 fetches all the alert configurations from user device 1202. The API 1204 can query database 1206 to get the account ID. The API 1204 returns the alert configuration keys (or a list of alert configuration keys) and names to the user device 1202. A second fetch from the API 1204 may be used to get an alert configuration and/or the account ID. The API 1204 can query database 1206 for the account ID and the alert configuration ID. The API 1204 can then return to the user device 1202 to the alert configuration body with all the parameters obtained.

Figure 14:
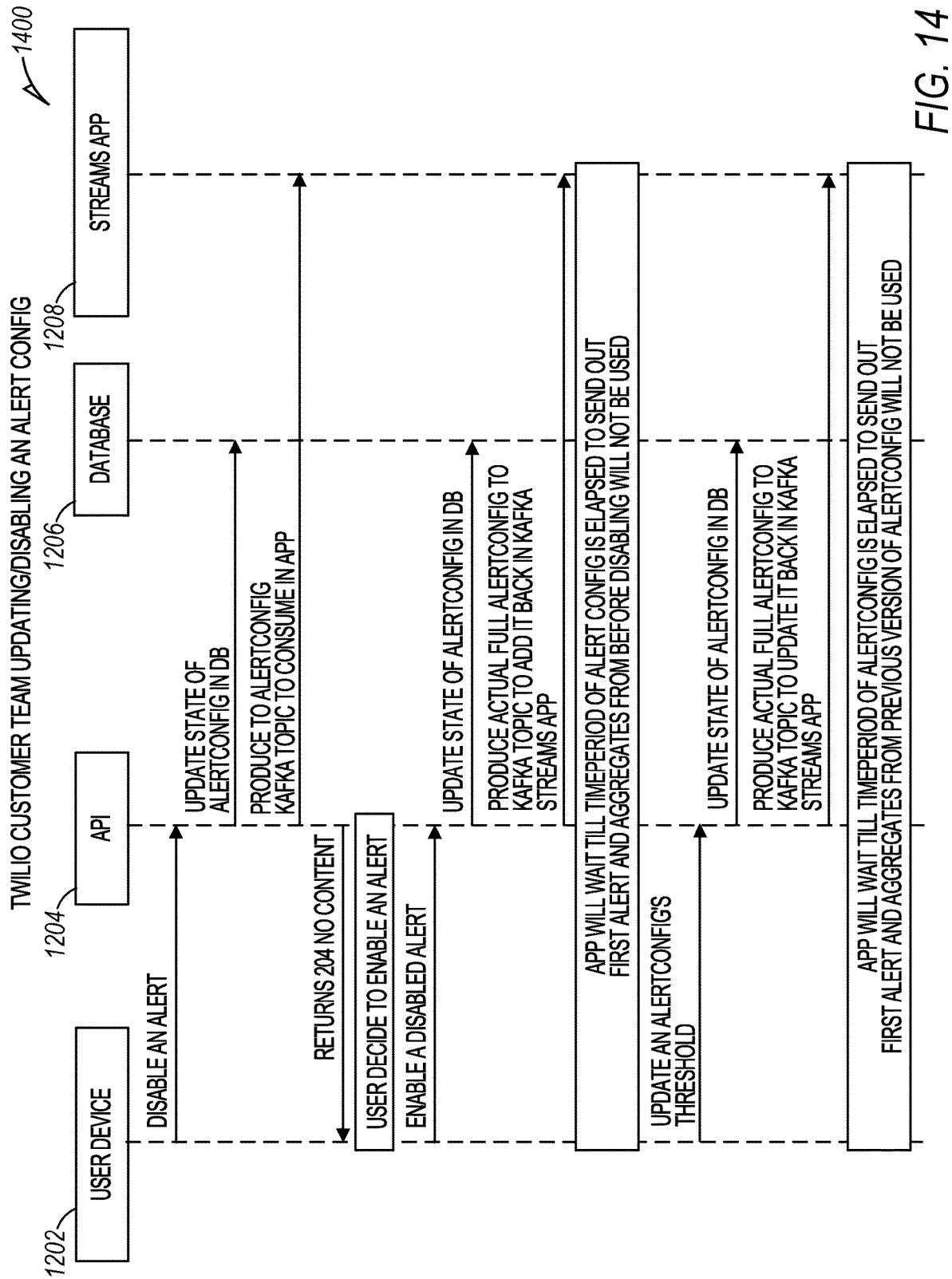
FIG. 14 shows a sequence diagram 1400 of operations to update or disable an alert configuration.

FIG. 14 shows a sequence diagram 1400 of operations to update or disable an alert configuration. In example embodiments, if the same alert configuration is modified concurrently by two users, the one which is processed later is the one that is updated. In example embodiments, the data streams processor for alert configurations reads and compares the two records and determines which of the two records was updated later by looking at the date update field. A first user may disable an alert and send the signal to the API 1204. The API 1204 sends an updated state of the alert configuration to the database 1206 and produces a null value to the streaming application 1208, which can process distributed event record to remove the alert configuration in the API 1204. A notification that the alert has been disabled is sent to the user device 1202. The user can later determine to enable the disabled alert and select on the user device 1202 that the disabled alert should be re-enabled. An update from the API 1204 is sent to the database 1206 and produces an alert configuration to send to the stream application 1208 distributed event record to review the alert configuration in the API 1204. Using the alert configuration, the API 1204 waits a predetermined period of time set by the alert configuration to elapse to send out the first alert and aggregate. The user device 1202 can also send an update regarding other metrics measured by the alert configuration. This includes changing the alert threshold of the alert configuration. Other metrics can also be changed. The updated alert configuration is then sent to the database 1206 and the streaming application 1208. The application 1204 will wait till a predetermined time period of the alert configuration has elapsed to send out the first alert and aggregates from the updated version of the alert configuration, and the previous version of the alert configuration will not be used.

Figure 15:
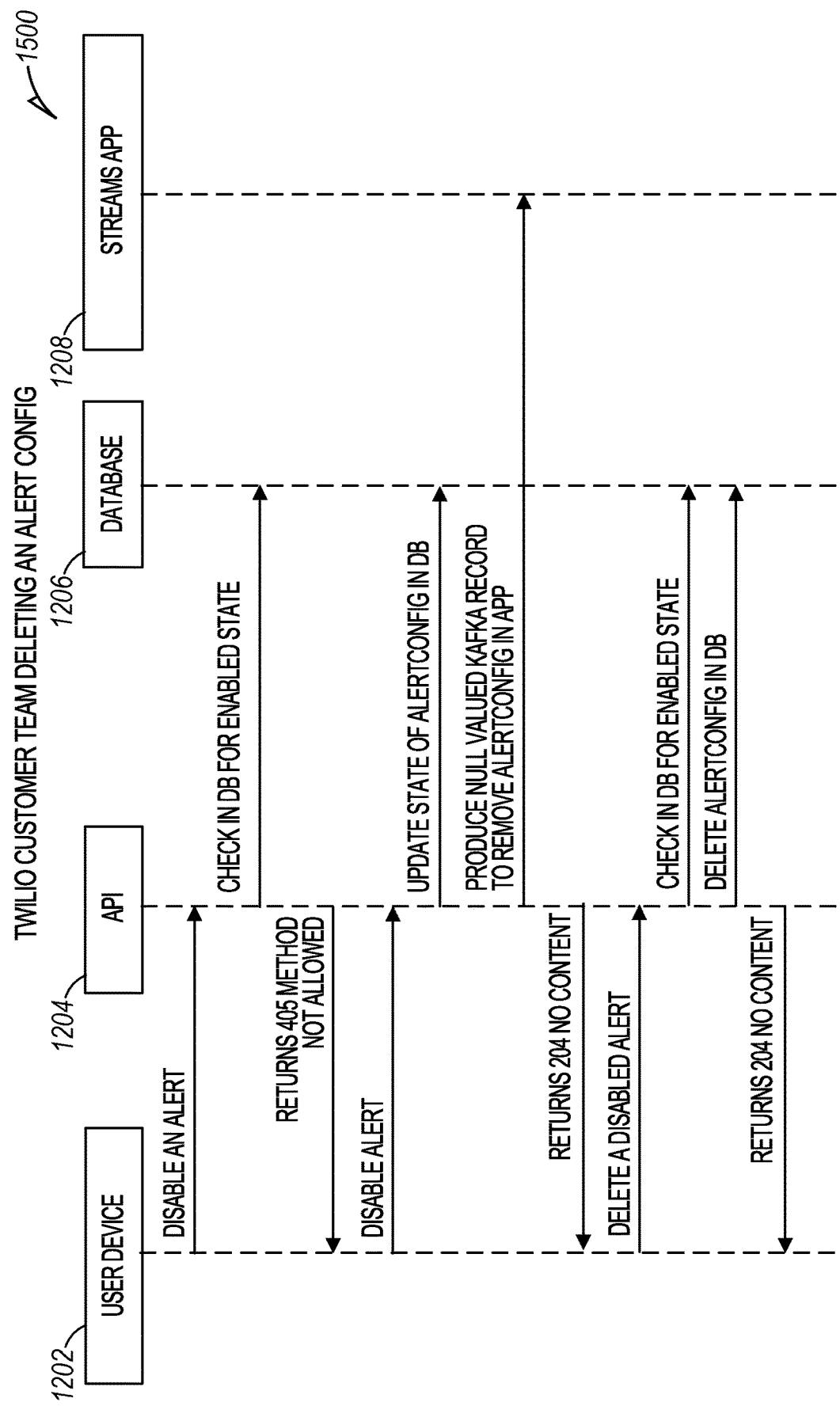
FIG. 15 shows a sequence diagram to delete an alert configuration.

FIG. 15 shows a sequence diagram 1500 to delete an alert configuration. Along with disabling an alert configuration, a user may delete the alert configuration when it is no longer useful in accordance with the user needs. The user device 1202 sends the signal that the user has indicated on the user device 1202 that the alert configuration is to be deleted. The API 1204 sends a check to database 1206 to determine the state of the alert configuration to see if it is in an enabled state or a disabled state. In some embodiments, the alert configuration will be set to a disabled state before the alert configuration can be deleted. In such embodiments, the user device 1202 sends a signal to the API 1204 that the alert configuration is to be disabled, the state of the alert is updated in the API 1204, and the update is sent to the streaming application 1208. After the alert configuration is disabled, a confirmation that the alert configuration is disabled is sent to the user device 1202. A signal is sent from the user device 1202 to delete the alert configuration. The database 1206 is checked to confirm the enabled/disabled status, and upon confirmation that the alert configuration is disabled, the alert configuration is deleted. A confirmation is sent to the user device 1202 that the alert configuration is deleted.

Figure 16:
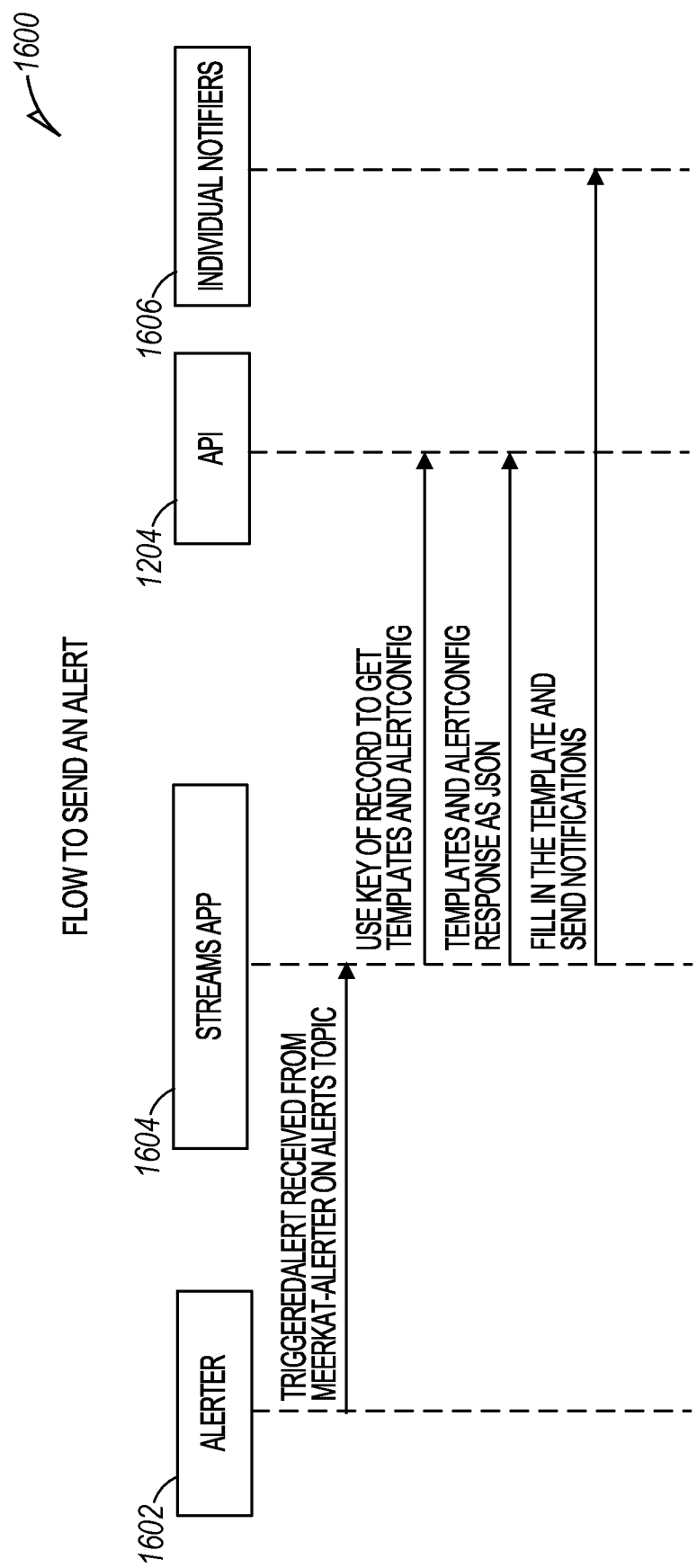
FIG. 16 shows a sequence diagram for an alert's notification flow.

FIG. 16 shows a sequence diagram 1600 for an alert notification flow. And alerter 1602 can send triggered alerts to a streaming application 1604. These trigger alerts can include alert topics. The streaming application 1604 can query API 1204 to get the template for the notification of the type of alert topic. The streaming application fills in the template for the notification using the template and the parameters and metrics from the alert and the alert configuration. The notification is then sent to the individual notifiers 1606.

Figure 17:
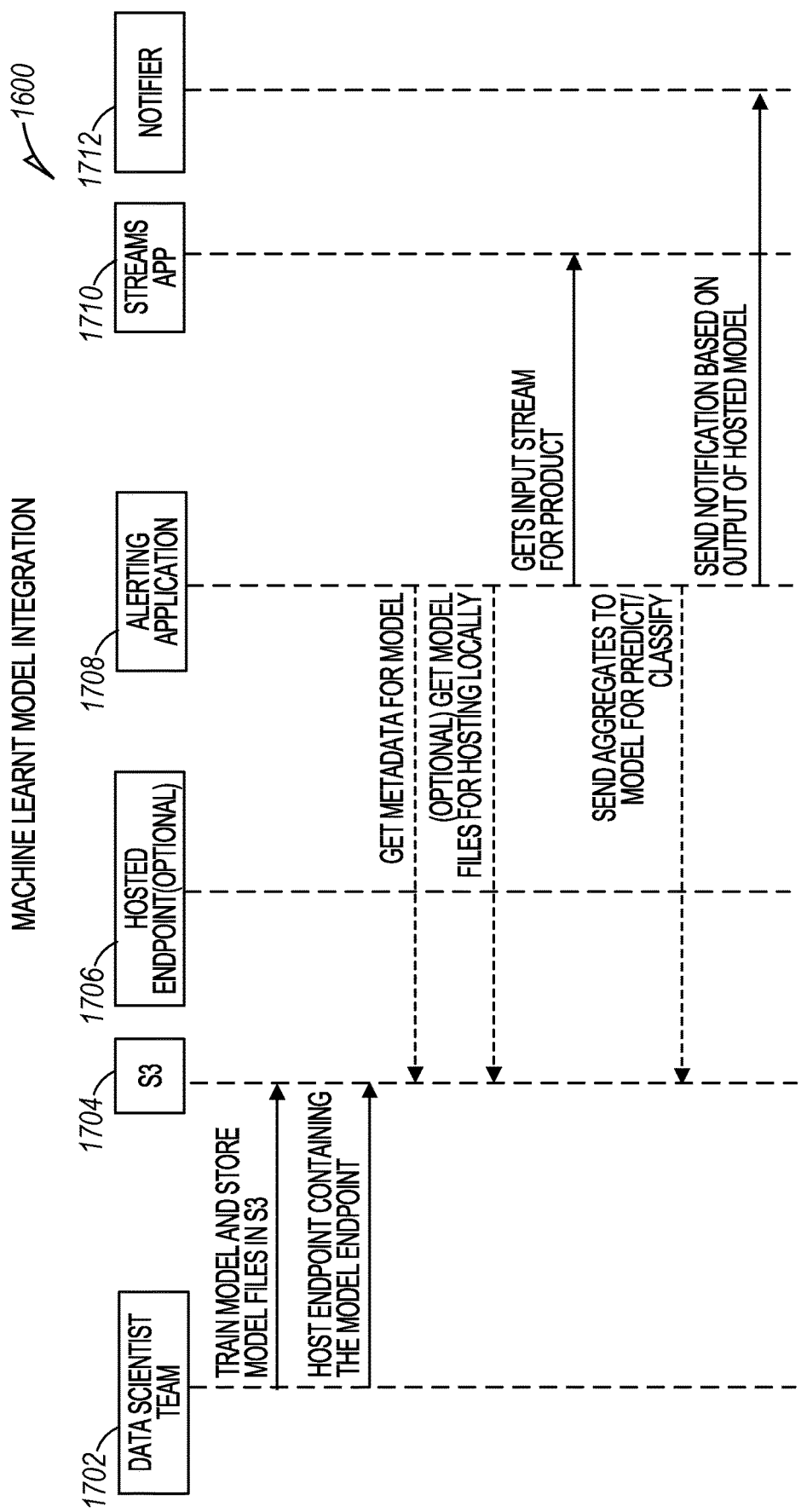
FIG. 17 shows a sequence diagram for machine learning model integration.

FIG. 17 shows a sequence diagram 1700 for machine learning model integration. Report Center may be configured for debug events, billing, messaging, and voice use cases to do threshold-based alerting at scale (e.g., for millions of accounts in real-time) using statistical operations. Such statistical operations may include operations such as count, sum, average, and percentage, among others.

The user may use the UI on the user device 1702 to set up the machine learning model, and the machine learning model may be trained using windowed aggregates from historical storage using APIs to get data. Other methods for training the model may be used as well. Users may build a storage layer to get data they need for use by the training model or use data from the database.

At 1704 discusses storing the machine learning model files in the S3 file 1704 to have the machine learning model. The machine learning model can be downloaded and brought up anywhere in the system. The machine learning model metadata file is set up in S3 to set up feature vectors for classification and/or prediction depending on how the machine learning model is trained. In some embodiments, the S3 file 1704 indicates what aggregate need to be calculated in real-time to send to the model and where the model will be hosted at the hosted endpoint 1706. The model may be hosted either locally or remotely.

At 1706 discusses the machine learning model endpoint hosting. Some embodiments may skip this step. Alerting platform team hosts the model inside each box in the alerting app cluster (for low latency reasons) at startup time. In some embodiments, the user device 1702 can bring up an endpoint or lambda function to call with the feature vector, and the alerting app can call that with the feature vector.

The alerting application 1708—Alerting app will calculate aggregates in real time based on the model metadata file and ask the endpoint for prediction/classification. In the case of prediction, the predicted number value will be checked against the threshold. In the case of classification, we expect the return value to be a Boolean.

The the alerting application 1708 requests for and receives an input stream for the product or message that the alerting application is interested in tracking from the stream application 1710. The alerting application can also send notification by the notifier 1712 the method of notification regarding the alerts is discussed. The results of the Alerting application get sent when an error state is either about to be entered or has already been entered into. Another notification is sent when the system sees that the error state has been resolved. The trained machine learning model detects anomalies or predicts bad conditions in customer data.

Regional Strategy

In example embodiments, the data streaming app and/or API is configured to be deployed in each region of a plurality of regions. In example embodiments, alert configurations or alerts from one region will not be replicated to other regions.

Retrigger Strategy for Alerts in the Same State for Long Periods

In example embodiments, if an alert is in an ERROR state for more than "retrigger_window" (e.g., defined by the user or an administrator), a notification will be sent again to the user with the current value at a time after which the retrigger_window time has elapsed since the original alert notification.

Data Compliance Strategy and Tooling

For compliance with account deletions, example embodiments will have a process to clean up alert-configs and notification preferences belonging to a deleted account or its subaccounts in the configuration database. A process in a toolkit may clean up data for deleted accounts in our time series database. This process may be responsible for purging historically triggered alerts for a deleted account. In some embodiments, the process is a spark job.

Service Level Objectives

Example embodiments may depend on the number of partitions of the input-ordered log of events as it defines the concurrency level in handling input records. Considering the traffic of input records per second, a corresponding number of recommended partitions may be identified and used, for example: — a) for 0 to 10 k records per second—37 partitions
b) for 10 k to 40 k records per second—67 partitions
c) for 40 k records and beyond—97 partitions based on these, example embodiments may have the following objectives:—

In example embodiments, a customer team may be notified of an alert within a preset time period after which the aggregate violates the threshold for an alert configuration. The more aggressively this is set as a service level agreement, the lesser number of alert configurations per account the system can handle as this service level objective defines the bottleneck of processing input records (first stage of Part B) as well as record-metrics (second stage of Part B).

Anything beyond a configurable time period counts as a violation.

The saturation Dimension is the maximum number of records per second. This gives us an estimate of spiky transient states and what behavior is acceptable during these spiky sessions by accounts. (Example of a spiky transient state includes when customers send a sudden spike of outbound messages at 6 am Pacific time and 12 pm Pacific time). If we relax the violation count to 5 or 15 minutes during these times, example embodiments may measure how much throughput (maximum number of records) can be supported.

The maximum number of alert configurations per account SID can be calculated per dataset. This service level agreement will be defined per dataset based on their input records per second.

Failure Modes

Data stream instance goes down or takes over excess resources on CPU/MEM—The failing/flailing host may be replaced, which may cause the standby tasks for the active tasks on that host to become active and take over the real processing.

Data broker rebalance/move topics to another broker—This may cause the leader election to happen quickly and all partitions hosted on that broker as the leader to be re-read from other brokers. This may cause a temporary disruption (increase in violations) depending on how long the new partition leader becomes available for reads and catching up to the offsets (e.g., anywhere between 30 seconds to 5 mins).

API loses connection to datastore—This may let the streaming application continue functioning and keep producing the triggered alerts, which may be stored in a database for historical view. If the downstream component that relies on API has a caching layer built, be able to use older or historic information to send notifications about the alert while this outage lasts. Example embodiments also have a cache layer inside API to store frequently fetched alert configurations.

Alternatives a) Caching solution to hold relevant data—Use a caching store for a distributed database to hold aggregates.

Bring up another real-time distributed database that has many roles or can be used as a managed cluster with a high licensing fee.

Load test of the real-time distributed database to hold data for our use cases and tune the database.

Deployment Strategy

API—In example embodiments, this is a Java dropwizard service deployed in a container (e.g., using admiral with lazarus enabled for replacement).

The service talks to a cluster that has a separate Read Alerter.

In example embodiments, this is a database streaming application deployed on cloud computer instances directly in a cluster. This service is deployed across multiple clusters. Each cluster is a single tenant specific to an integration. Hosts in each cluster use non-volatile memory drives to improve latency. Data is replicated multiple times. A minimum of 3 times which includes one leader and two followers—to allow for fast host failures.

Maintenance Strategy

API

A system may be enabled for this Java dropwizard role which looks at health check failures from the container/instance and replaces the box if needed.

For loss of connectivity to the database, caching is built into the API to avoid forward progress when no successful writes or updates happen until the database is available.

The database is made resilient using a write-read split. In some examples, this is at least two read replicas for a main write instance. Allowing for writing to a standby instance in another database in case of a failover. Considering a database proxy and multiple read replicas present, we expect the case of total database connection loss to be reduced and have at least a three nines uptime.

Alerter

In example embodiments, the streaming application clusters have an auto-replace enable for instances in case of an instance health-check failure. This causes a rebalance on the application, the standby tasks take over the processing, and tasks are redistributed amongst the online instances.

In example embodiments, the application is configured to handle instance losses in under a minute by leveraging standby tasks and using incremental rebalancing among the tasks.

Figure 18:
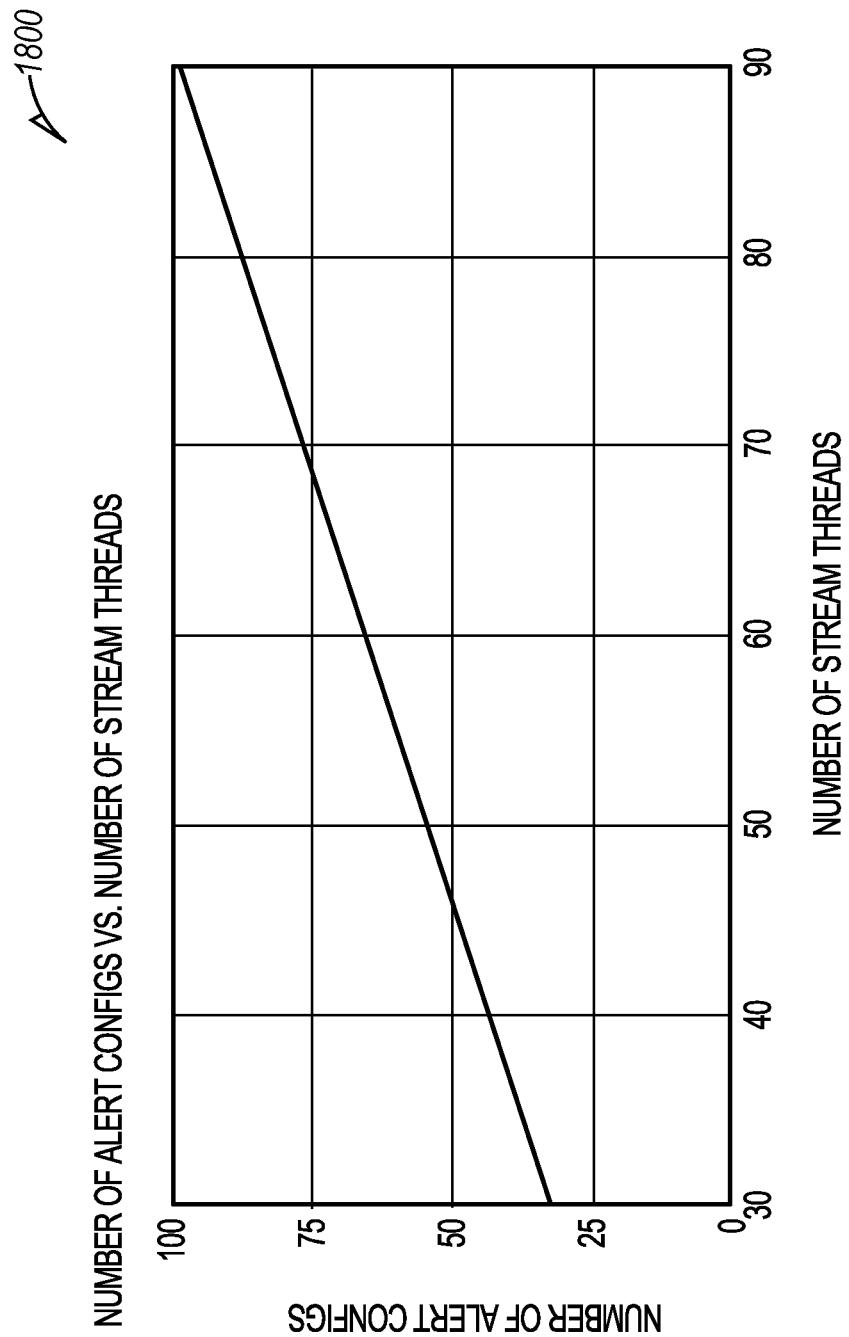
FIG. 18 shows test results of the number of alert configurations vs. the number of stream threads the system monitors.

FIG. 18 shows test results 1800 of the number of alert configurations vs. the number of stream threads the system monitors. Three variables were used to define how the number of alert configs supported can scale, directly proportional to the number of input topic partitions, inversely proportional to the number of records per second, and directly proportional to the number of seconds before the delay in triggering alert is called a violation.

Figure 19:
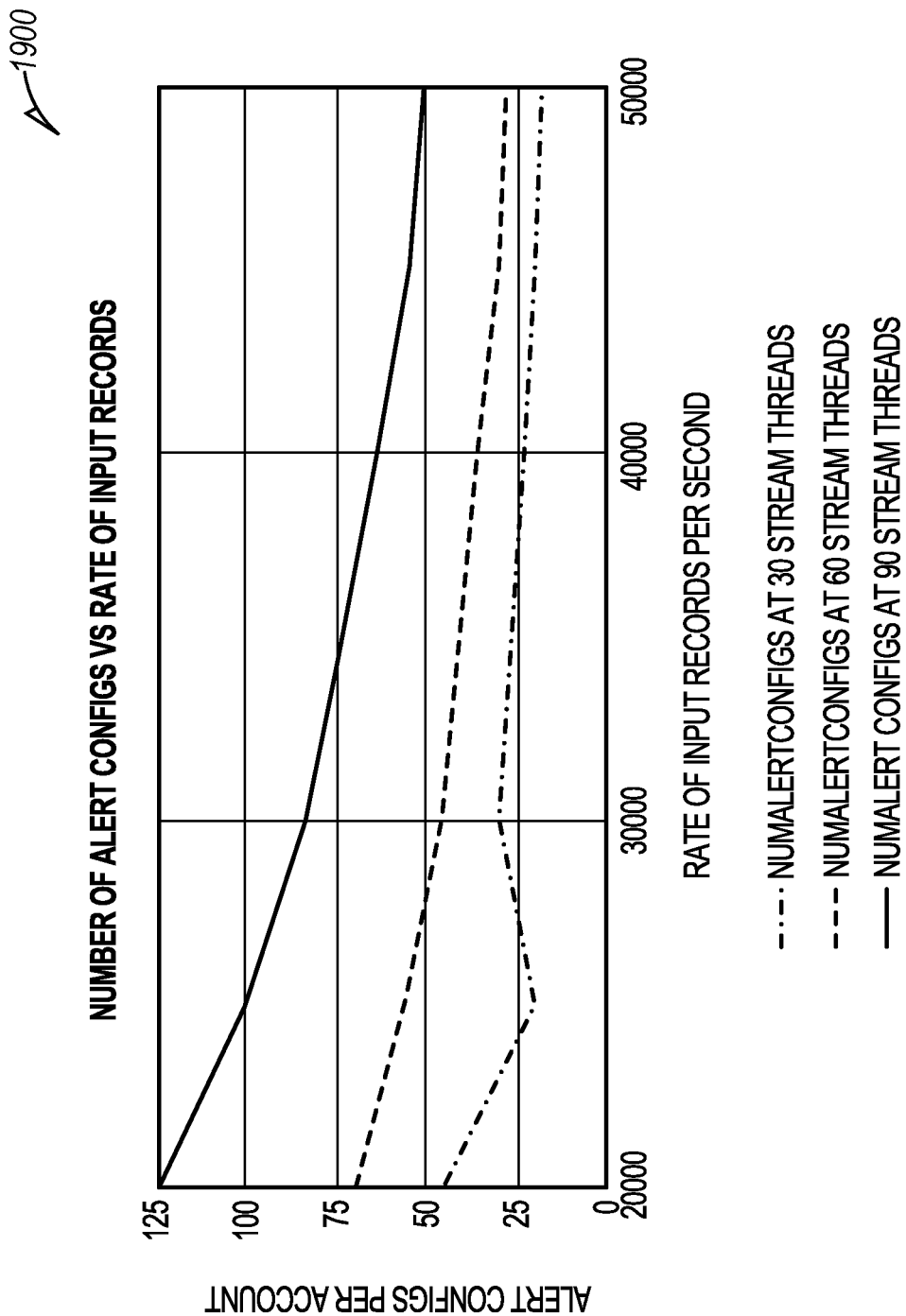
FIG. 19 shows a graphical representation of how the system can scale to a larger number of accounts and records for alert configurations.

FIG. 19 shows a graphical representation 1900 of how the system can scale to a larger number of accounts and records for alert configurations. The graphical representation shows at the low end 30 stream threads with 45, 60 stream threads, and 90 stream threads vs. the rate on input records per second.

Definitions

Enterprise Insights/Report Center—Analytics solution exposed to customers through the console.

Alert configuration—Configuration defining what an alert is about, what kind of records need to be filtered for calculating such an alert, which account identified by the account ID or secure account ID it caters to, and where to send notifications when the alert is triggered.

TriggeredAlert—An end result is recorded from the system describing if an enabled alert configuration's current value is in ERROR or RECOVERED condition along with other corresponding properties describing the state.

Dataset—Metadata defining the shape of data flowing through the system like schema version, kafka topic, idempotency keys, datetime field type and definition, etc.

In example embodiments, composite alerts are provided (e.g., alerts with arithmetic over two or more disparate metrics of the same account)

Example Mobile Device

Figure 20:
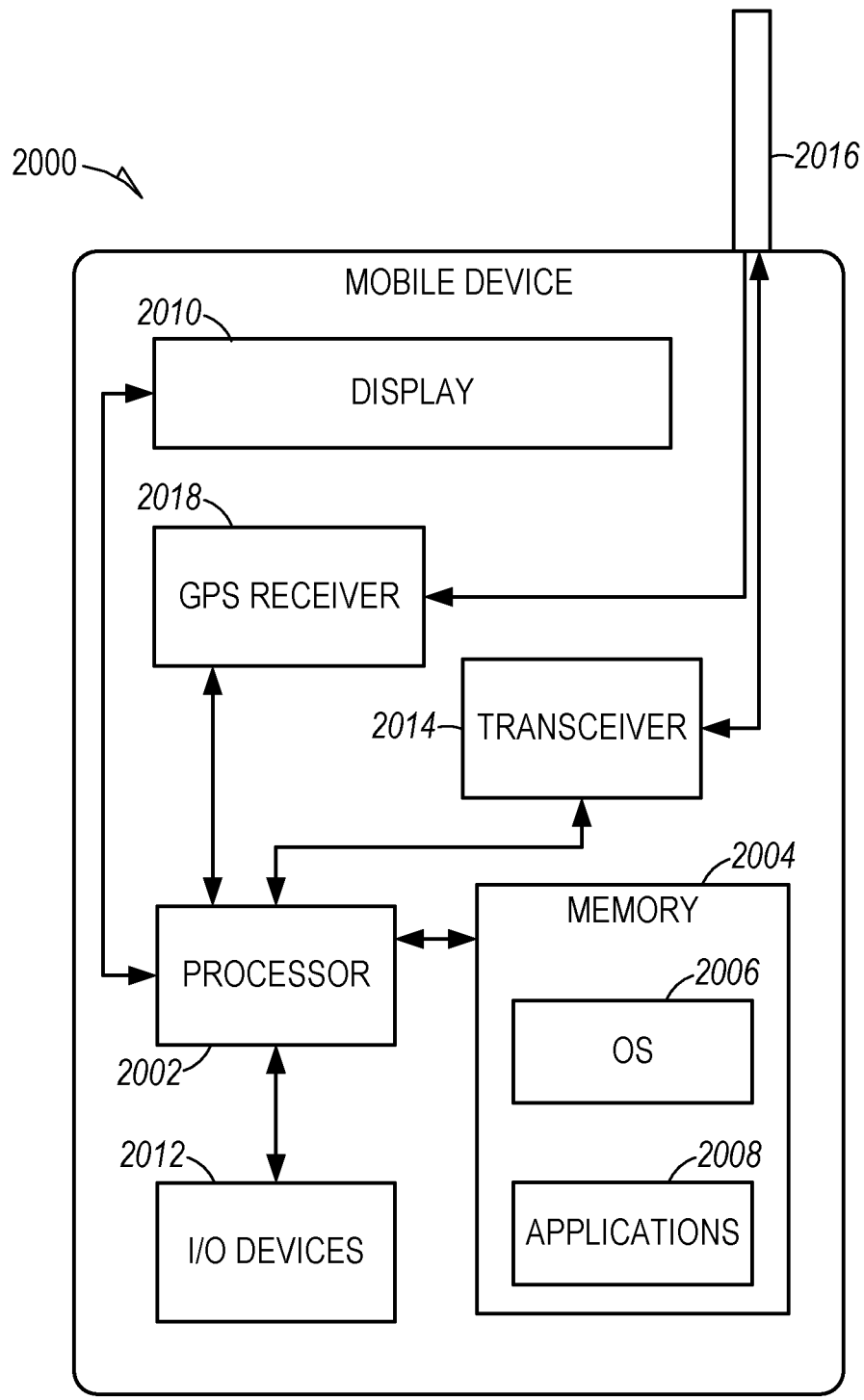
FIG. 20 is a block diagram illustrating a mobile device according to an example embodiment.

FIG. 20 is a block diagram illustrating a mobile device 2000, according to an example embodiment. The mobile device 2000 can include a processor 2002. The processor 2002 can be any of a variety of different types of commercially available processors suitable for mobile devices 2000 (for example, an XScale architecture microprocessor, a Microprocessor without Interlocked Pipeline Stages (MIPS) architecture processor, or another type of processor). A memory 2104, such as a random access memory (RAM), a Flash memory, or other type of memory, is typically accessible to the processor 2002. The memory 2104 can be adapted to store an operating system (OS) 2006, as well as application programs 2008, such as a mobile location-enabled application that can provide location-based services (LBSs) to a user. The processor 2002 can be coupled, either directly or via appropriate intermediary hardware, to a display 2010 and to one or more input/output (I/O) devices 2012, such as a keypad, a touch panel sensor, a microphone, and the like. Similarly, in some embodiments, the processor 2002 can be coupled to a transceiver 2014 that interfaces with an antenna 2016. The transceiver 2014 can be configured to both transmit and receive cellular network signals, wireless data signals, or other types of signals via the antenna 2016, depending on the nature of the mobile device 2000. Further, in some configurations, a GPS receiver 2018 can also make use of the antenna 2016 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In various example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 21:
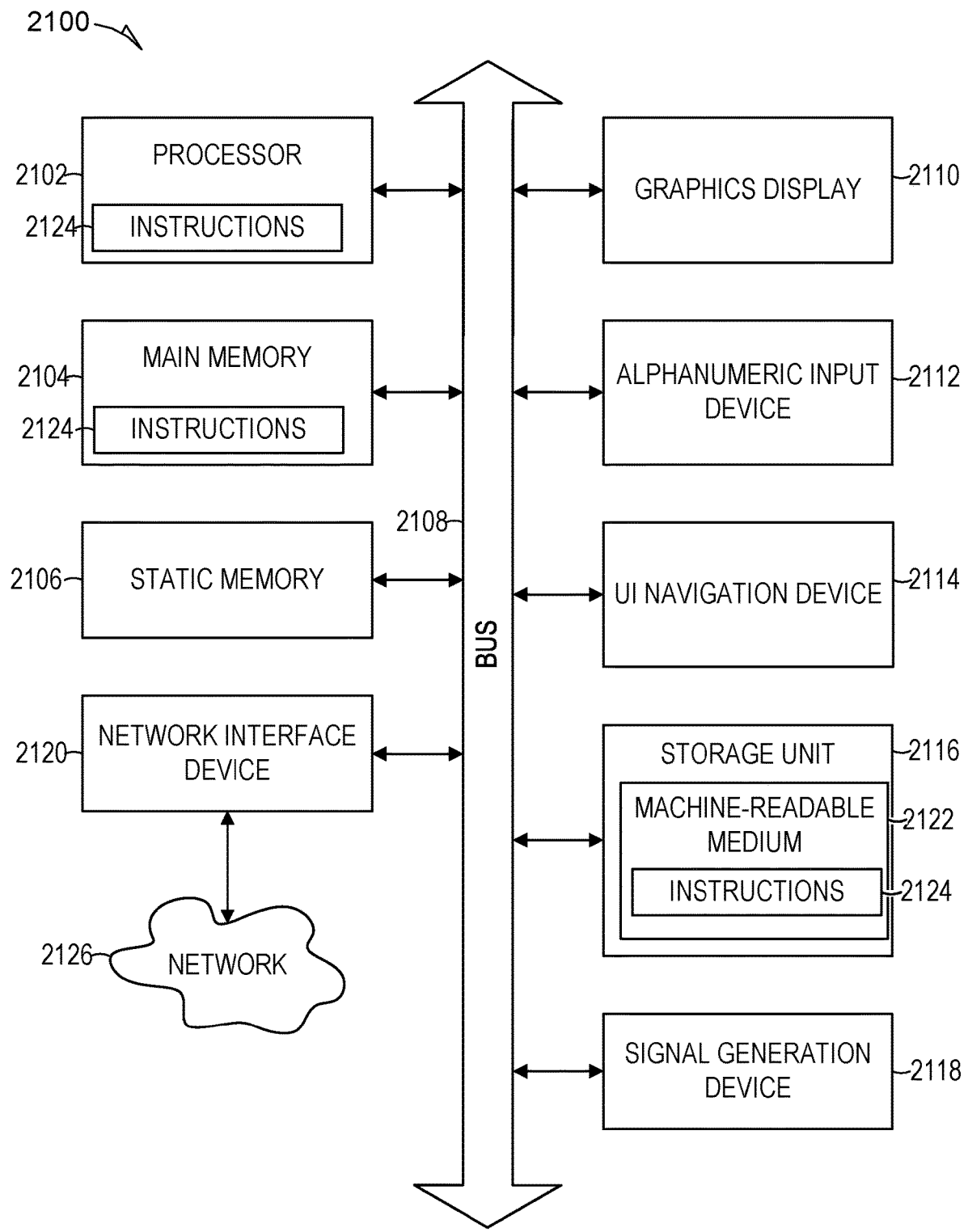
FIG. 21 is a block diagram of an example computer system on which methodologies and operations described herein may be executed in accordance with an example embodiment.

FIG. 21 is a block diagram of an example computer system 2100 on which methodologies and operations described herein may be executed, in accordance with an example embodiment. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU), a graphics processing unit (GPU) or both), a main memory 2104 and a static memory 2106, which communicate with each other via a bus 2108. The computer system 2100 may further include a graphics display unit 2110 (e.g., a liquid crystal display (LCD) or a cathode ray tube (CRT)). The computer system 2100 also includes an alphanumeric input device 2112 (e.g., a keyboard or a touch-sensitive display screen), a user interface (UI) navigation device 2114 (e.g., a mouse), a storage unit 2116, a signal generation device 2118 (e.g., a speaker) and a network interface device 2120.

Machine-Readable Medium

The storage unit 2116 includes a machine-readable medium 2122 on which is stored one or more sets of instructions and data structures (e.g., software) 1724 embodying or utilized by any one or more of the methodologies, operations, or functions described herein. The instructions 2124 may also reside, completely or at least partially, within the main memory 2104 and/or within the processor 2102 during execution thereof by the computer system 2100, the main memory 2104 and the processor 2102 also constituting machine-readable media.

While the machine-readable medium 2122 is shown in an example embodiment to be a single medium, the term "machine-readable medium" may include a single medium or multiple media (e.g., a centralized or distributed database, and/or associated caches and servers) that store the one or more instructions 2124 or data structures. The term "machine-readable medium" shall also be taken to include any tangible medium that is capable of storing, encoding or carrying instructions (e.g., instructions 2124) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2124 may further be transmitted or received over a communications network 2126 using a transmission medium. The instructions 2124 may be transmitted using the network interface device 2120 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any examples provided herein are provided by way of illustration and under specific conditions using a specific embodiment or embodiments; accordingly, neither these examples nor their implementations shall be used to limit the scope of the disclosure of the current patent document.

It shall also be noted that although embodiments described herein may be within the context of client-side enrichment and transform, aspects of the present disclosure are not so limited. Accordingly, the aspects of the present disclosure may be applied or adapted for use in other contexts.

What is claimed is:

1. A method comprising:
    receiving an alert condition pertaining to delivery of a plurality of messages, the alert condition specifying a threshold number of dropped or failed deliveries;
    based on a first time period elapsing, performing a first system check, the first system check including, based on a detection that a first message of the plurality of messages has been dropped during the first time period, incrementing a count for a dropped queue associated with the plurality of messages; and
    based on a second time period elapsing, performing a second system check, the second system check including, based on a detection that the first message has failed during the second time period, decrementing the count for the dropped queue associated with the plurality of messages and incrementing a count for a failed queue associated with the plurality of messages, based on a detection that a second message has been dropped during the second time period, incrementing the count for the dropped queue, and generating an alert based on a total of the dropped queue and the failed queue transgressing the threshold number.

2. The method of claim 1, further comprising using a user interface to set up an alert configuration that includes the alert condition, the first time period, and the second time period.

3. The method of claim 1, further comprising transmitting the generated alert to a parent account identified in an alert configuration.

4. The method of claim 1, wherein the plurality of messages include an ordered log of events from an event stream.

5. The method of claim 1, wherein the second system check includes an operation to be performed based on the count for the dropped queue or the count for the failed queue.

6. The method of claim 5, wherein the operation includes applying one or more of a sum, an average, or a percentage to values comprising the count for the dropped queue or the count for the failed queue.

7. The method of claim 1, wherein a partition key is determined based on either or both of an account ID or a time window.

8. A system comprising:
one or more computer memories;
one or more computer processors; and
a set of instructions incorporated into the one or more computer memories, the set of instructions configuring the one or more processors to perform operations, the operations comprising:
receiving an alert condition pertaining to delivery of a plurality of messages, the alert condition specifying a threshold number of dropped or failed deliveries;
based on a first time period elapsing, performing a first system check, the first system check including, based on a detection that a first message of the plurality of messages has been dropped during the first time period, incrementing a count for a dropped queue associated with the plurality of messages; and
based on a second time period elapsing, performing a second system check, the second system check including, based on a detection that the first message has failed during the second time period, decrementing the count for the dropped queue associated with the plurality of messages and incrementing a count for a failed queue associated with the plurality of messages, based on a detection that a second message has been dropped during the second time period, incrementing the count for the dropped queue, a and generating an alert based on a total of the dropped queue and the failed queue transgressing the threshold number.

9. The system of claim 8, further comprising using a user interface to set up an alert configuration that includes the alert condition, the first time period and the second time period.

10. The system of claim 8, further comprising transmitting the generated alert to a parent account identified in an alert configuration.

11. The system of claim 8, wherein the plurality of messages include an ordered log of events from an event stream.

12. The system of claim 8, wherein the second system check includes an operation to be performed based on the count for the dropped queue or the count for the failed queue.

13. The system of claim 12, wherein the operation includes applying one or more of a sum, an average, or a percentage to the values comprising the count for the dropped queue or the count for the failed queue.

14. The system of claim 8, wherein a partition key is determined based on either or both of an account ID or a time window.

15. A non-transitory computer-readable medium storing a set of instructions that, when executed by one or more computer processors, causes the one or more computer processors to perform operations, the operations comprising:
receiving an alert condition pertaining to delivery of a plurality of messages, the alert condition specifying a threshold number of dropped or failed deliveries;
based on a first time period elapsing, performing a first system check, the first system check including, based on a detection that a first message of the plurality of messages has been dropped during the first time period, incrementing a count for a dropped queue associated with the plurality of messages; and
based on a second time period elapsing, performing a second system check, the second system check including, based on a detection that the first message has failed during the second time period, decrementing the count for the dropped queue associated with the plurality of messages and incrementing a count for a failed queue associated with the plurality of messages, based on a detection that a second message has been dropped during the second time period, incrementing the count for the dropped queue, and generating an alert based on a total of the dropped queue and the failed queue transgressing the threshold number.

16. The non-transitory computer-readable medium of claim 15, further comprising using a user interface to set up an alert configuration that includes the alert condition, the first time period and the second time period.

17. The non-transitory computer-readable medium of claim 15, further comprising transmitting the generated alert to a parent account identified in an alert configuration.

18. The non-transitory computer-readable medium of claim 15, wherein the plurality of messages include an ordered log of events from an event stream.

19. The non-transitory computer-readable medium of claim 15, wherein the second system check includes an operation based to be performed on the count for the dropped queue or the count for the failed queue.

20. The non-transitory computer-readable medium of claim 19, wherein the operation includes applying one or more of a sum, an average, or a percentage to values comprising the count for the dropped queue or the count for the failed queue.

* * * * *